United States Patent [19]
Yoshisato

[11] 4,165,486
[45] Aug. 21, 1979

[54] SINGLE SIDEBAND TRANSCEIVER
[75] Inventor: Akiyuki Yoshisato, Soma, Japan
[73] Assignee: Alps Electric Co., Ltd., Japan
[21] Appl. No.: 860,756
[22] Filed: Dec. 15, 1977

Related U.S. Application Data
[63] Continuation-in-part of Ser. No. 826,408, Aug. 22, 1977.

[30] Foreign Application Priority Data
Dec. 16, 1976 [JP] Japan ................... 51-151395
Dec. 16, 1976 [JP] Japan ................... 51-151396

[51] Int. Cl.$^2$ .................................. H04B 1/40
[52] U.S. Cl. .................................. 325/17; 325/25;
                                              325/50; 325/55; 325/330
[58] Field of Search ............... 325/17, 18, 21, 25,
       325/49, 50, 55, 63, 64, 329, 330, 331; 179/15 BP

[56] References Cited
U.S. PATENT DOCUMENTS

| | | | |
|---|---|---|---|
| 3,320,535 | 5/1967 | Broadhead, Jr. | 325/49 |
| 3,413,554 | 11/1968 | Yates | 325/17 |
| 3,641,434 | 2/1972 | Yates | 325/17 |
| 3,983,484 | 9/1976 | Hodama | 325/20 |
| 4,061,974 | 12/1977 | Fletcher | 325/63 |

Primary Examiner—Robert L. Griffin
Assistant Examiner—Michael A. Masinick
Attorney, Agent, or Firm—Guy W. Shoup; Gerard F. Dunne

[57] ABSTRACT

A transmitter unit comprises two resonant circuits which are caused to oscillate during transmission to produce two pilot signals of predetermined frequencies. The pilot signals are mixed with an audio signal and used to modulate a transmission carrier signal in a balanced modulator which forms two sideband signals. The transmission carrier signal and one of the sideband signals are suppressed to form a single sideband signal which is used to modulate a channel signal for transmission. A receiver unit comprises a voltage controlled local oscillator which produces a local oscillator signal which is hetrodyned with the modulated channel signal to recover the single sideband signal. A reception carrier signal is hetrodyned with the single sideband signal in a balanced demodulator to recover the pilot signals and audio signal, the latter of which is fed to a speaker. The pilot signals are applied to a first frequency detector which detects the difference frequency thereof and triggers a voltage sweep generator to apply a voltage sweep to the local oscillator thereby causing a local oscillator frequency sweep. The pilot signals are further fed to the resonant circuits which are used during reception as second and third frequency detectors which detect when the heterodyned pilot signals reach their predetermined frequencies and interrupt the control voltage sweep at that instant, maintaining the local oscillator signal at the proper frequency. Means are provided to reset the receiver unit to manual local oscillator control if a control voltage sweep is completed without detection of the pilot signals by the second and third frequency detectors.

6 Claims, 6 Drawing Figures

SINGLE SIDEBAND TRANSCEIVER

This application is a continuation-in-part of my pending earlier application Ser. No. 826,408 filed Aug. 22, 1977. The disclosures and descriptions contained in said earlier application are hereby incorporated into this application.

BACKGROUND OF THE INVENTION

The present invention relates to an improved single sideband transceiver ideally suited for citizen's band operation.

Single sideband operation is desirable in citizen's band communication from the standpoint of reductions in operating power, bandwidth and interference. In citizen's band class "D" operation, the maximum allowable frequency deviation is ±0.005%, or about ±1350 Hz. While a frequency deviation near the maximum limit causes no major problem in typical AM transmission, it renders the transmission unintelligible in single sideband (SSB) transmission. Generally, in the SSB mode the frequency may deviate by only about 50 Hz to 100 Hz if articulation is to be tolerable.

Unless a SSB transceiver is provided with a highly stable crystal oscillator maintained in a constant temperature enclosure, the frequency deviation will generally be as high as ±1000 Hz. However, the frequency deviation must be ±25 Hz to ±50 Hz for proper articulation, which is 1/27 to 1/54 of the statutory maximum permissible deviation. To ensure intelligibility, the frequency deviation must be 1/50 that of an oscillator of the type normally used in AM transmission. Oscillators of such stability are quite expensive and may make the cost of a SSB citizen's band transceiver commercially unattractive.

The problem may be overcome by providing an inexpensive oscillator in a transceiver in combination with a manual local oscillator frequency adjustment. After selecting the desired channel, the operator rotates the adjustment until he achieves maximum articulation or clarity. Such an adjustment is generally referred to as a fine tuning or clarifier control. However, such a system is a safety hazard in transceivers employed in automobiles since it distracts the driver from the operation of the vehicle. Safe drivers will generally switch the transceiver to the AM mode, if available, in order to eliminate the need for fine tuning. This, of course, results in a reduction of power and an increase in interference.

SUMMARY OF THE INVENTION

In accordance with the present invention, a citizen's band SSB transceiver comprises a transmitter unit including two resonant circuits which are caused to oscillate during transmission to produce two pilot signals of predetermined frequencies. The pilot signals are mixed with an audio signal and used to modulate a transmission carrier signal in a balanced modulator which forms two sideband signals. The transmission carrier signal and one of the sideband signals are suppressed to form a single sideband signal which is used to modulate a channel signal for transmission. A receiver unit comprises a voltage controlled local oscillator which produces a local oscillator signal which is hetrodyned with the modulated channel signal to recover the sideband signal. A reception carrier signal is hetrodyned with the single sideband signal in a balanced demodulator to recover the pilot signals and audio signal, the latter of which is fed to a speaker. The pilot signals are applied to a first frequency detector which detects the difference frequency thereof and triggers a voltage sweep generator to apply a voltage sweep to the local oscillator thereby causing a local oscillator frequency sweep. The pilot signals are further fed to the resonant circuits which are used during reception as second and third frequency detectors which detect when the hetrodyned pilot signals reach their predetermined frequencies and interrupts the control voltage sweep at that instant, maintaining the local oscillator signal at the proper frequency. Means are provided to reset the receiver unit to manual local oscillator fine tuning if the control voltage sweep is completed without detection of the pilot signals by the second and third frequency detectors. This latter condition may occur due to a malfunction or if transmission is interrupted before the automatic fine tuning locks in. A filter is controlled by the local oscillator to prevent the pilot signals from reaching a speaker during the automatic fine tuning operation.

It is an object of the present invention to provide a single sideband transceiver comprising automatic fine tuning means.

It is another object of the present invention to provide a single sideband transceiver which effects automatic fine tuning by means of two pilot signals transmitted for a brief period of time at the beginning of transmission.

It is another object of the present invention to provide a single sideband transceiver which eliminates a safety hazzard heretofore present when a single sideband transceiver was employed in an automotive vehicle and operated by the driver.

It is another object of the present invention to increase the articulation in single sideband citizen's band transmission.

It is another object of the present invention to increase the performance and reduce the manufacturing cost of a single sideband transceiver.

It is another object of the present invention to provide a generally improved single sideband transceiver.

Other objects, together with the foregoing, are attained in the embodiment described in the following description and illustrated in the accompanying drawing.

DESCRIPTION OF THE PREFERRED EMBODIMENT

While the single sideband transceiver of the invention is susceptible of numerous physical embodiments, depending upon the environment and requirements of use, substantial numbers of the herein shown and described embodiment have been made and tested and all have performed in an eminently satisfactory manner.

Figure 1:
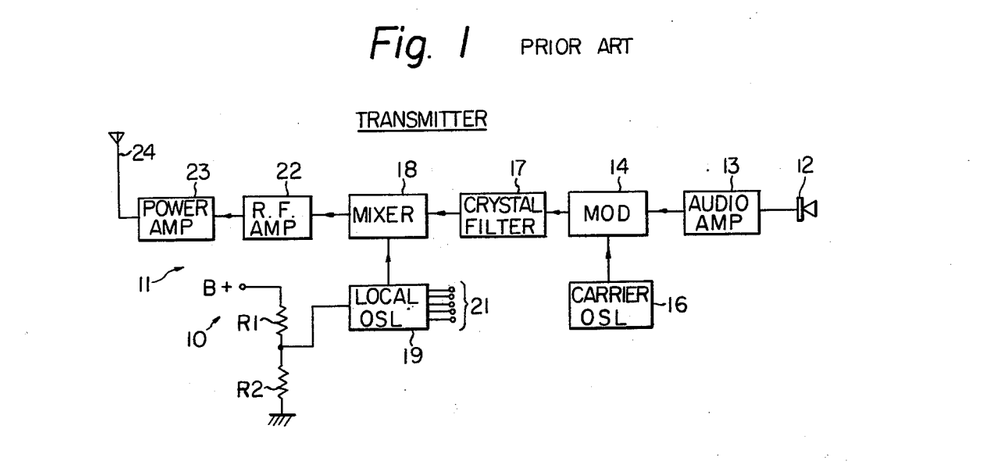
FIG. 1 is a block diagram of a transmitter unit of a prior art single sideband transceiver.

Referring now to FIG. 1 of the drawings, a prior art citizen's band single sideband transceiver is generally designated by the reference numeral 10 and comprises a transmitter unit 11 which includes a microphone 12. Audio sounds impinging on the microphone 12 are amplified by an audio amplifier 13 and applied to a balanced modulator 14. A beat frequency oscillator (BFO) or carrier signal oscillator 16 generates a transmission carrier signal which is fed into the modulator 14 and mixed with the audio signal to form two sideband signals. The carrier signal is suppressed by the modulator 14 and one of the sideband signals is suppressed by means of a crystal filter 17. The unsuppressed sideband signal or single sideband signal is applied to a mixer 18 in which it is mixed with a channel signal of a suitable frequency from a channel signal local oscillator 19. Whereas the carrier oscillator 16 comprises a single crystal oscillator which generates a single fixed frequency (not shown), the local oscillator 19 comprises a phase locked loop (PLL) synthesizer which comprises one or more crystal oscillators which generate frequencies which can be divided and/or combined to provide channel signals for the 40 class "D" citizen's band channels. The particular channel desired is selected by means of switch inputs which are collectively designated as 21.

The local oscillator 19 is of the voltage controlled oscillator (VCO) type such that the frequency thereof is adjustable by means of an applied control voltage. For transmission, a fixed control voltage is applied to the local oscillator 19 by means of a voltage divider comprising resistors R1 and R2.

The single sideband signal and the channel signal are heterodyned or mixed together in the mixer 18 to provide a modulated channel signal of the proper citizen's band channel frequency which is amplified by a radio frequency amplifier 22, a power amplifier 23 and radiated into the atmosphere from an antenna 24.

Figure 2:
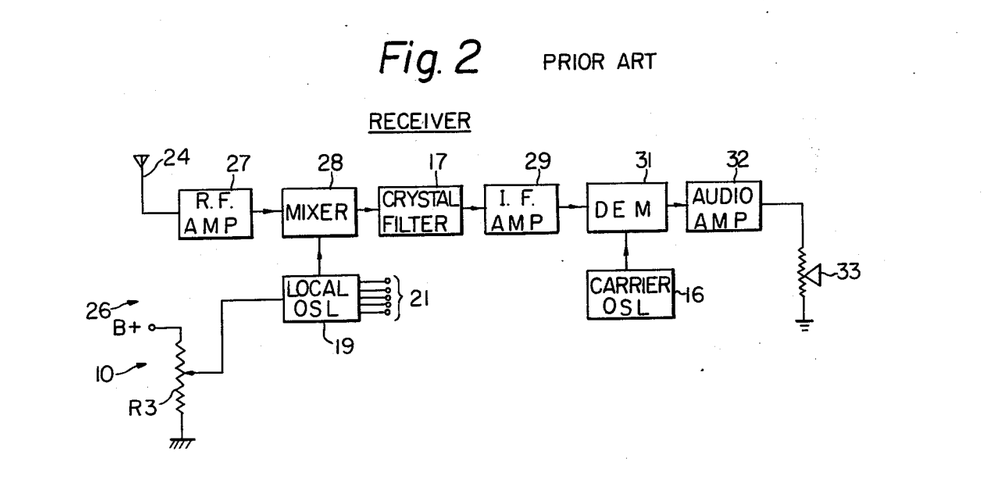
FIG. 2 is a block diagram of a receiver unit of the prior art transceiver.

The transceiver 10 further comprises a receiver unit 26 which is illustrated in FIG. 2. The receiver unit 26 includes the antenna 24 which bifunctions for reception and a radio frequency amplifier 27 which amplifies an incoming modulated channel signal. The amplified signal is applied to a mixer 28 in addition to a local oscillator signal from the local oscillator 19 which also bifunctions for reception. However, the control voltage applied to the local oscillator 19 is, during reception, applied thereto by means of a manually controlled potentiometer R3 which serves as fine tuning control. The local oscillator signal is heterodyned with the channel signal to recover the single sideband signal which constitutes an intermediate frequency signal. More specifically, the intermediate frequency signal is either the sum or difference of the modulated channel signal frequency and the local oscillator frequency, as desired. Only the intermediate frequency signal is passed through the crystal filter 17 and amplified by an intermediate frequency amplifier 29. The intermediate frequency signal is applied to a balanced demodulator 31 and mixed with a reception carrier signal from the carrier signal oscillator 16 to recover the audio signal which is amplified by an audio amplifier 32 and fed to a speaker 33.

The local oscillator 19 is of an inexpensive type, and the local oscillator signal may deviate by as much as ±1000 Hz from the required frequency whereby the intermediate frequency signal will deviate by the same amount, rendering the audio signal inarticulate. In order to render the audio signal intelligible, the potentiometer R3 is provided to adjust the local oscillator frequency over a suitable range. The transceiver operator rotates the knob (not shown) of the potentiometer R3 until he perceives the sound from the speaker 33 to be most articulate. As mentioned above, this fine tuning operation is a nuisance and constitutes a definite safety hazzard when the transceiver 10 is operated by the driver of a motor vehicle while the vehicle in motion.

Figure 3:
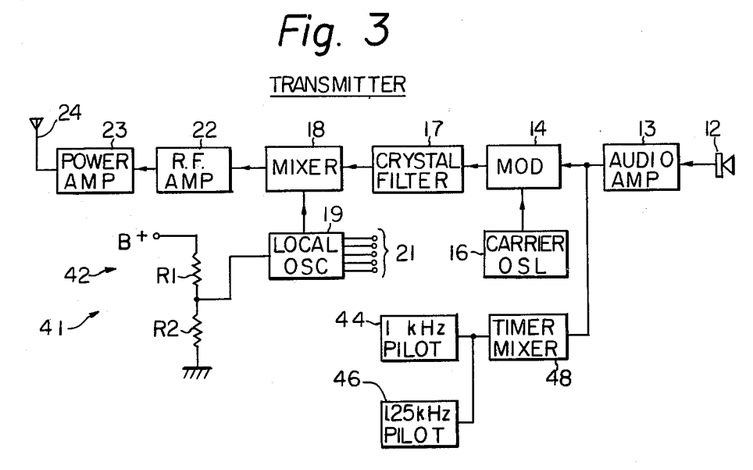
FIG. 3 is a block diagram of a transmitter unit of a single sideband transceiver embodying the present invention.
Figure 4:
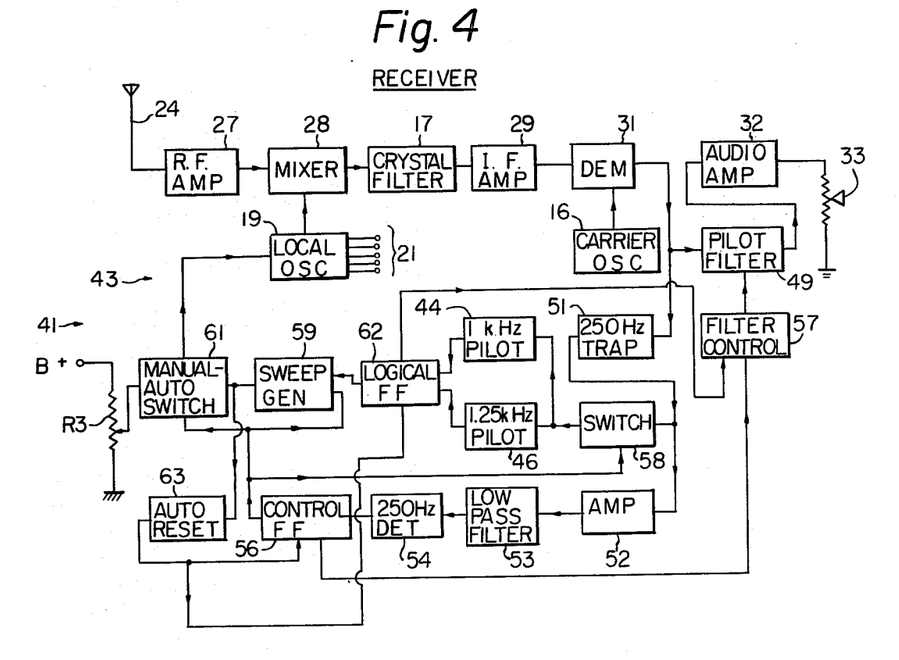
FIG. 4 is a block diagram of a receiver unit of the present transceiver.

This serious drawback of the prior art is overcome in a single sideband transceiver 41 of the present invention which comprises a transmitter unit 42 shown in FIG. 3 and a receiver unit 43 which is shown in FIG. 4. The transceiver 41 comprises basic components identical to those of the prior art transceiver 10 which are designated by the same reference numerals. Furthermore, the basic operation of the transceiver 41, except as will be described hereinbelow, is identical to the operation of the transceiver 10 and will not be described repetitiously.

As shown in FIG. 3, the transmitter unit 42 comprises a 1 kHz pilot unit 44 and a 1.25 kHz pilot unit 46 which, when a transmit-receive switch 47 (see FIG. 5) is moved to a transmit position, are controlled thereby to oscillate and generate pilot signals at 1 kHz and 1.25 kHz respectively. These pilot signals are applied to a timer-mixer 48 which gates the pilot signals therethrough to the modulator 14 for a predetermined short period of time such as 0.5 sec. The pilot signals are applied to modulate the transmission carrier signal in addition to the audio signal. In other words, the pilot signals are superimposed on the audio signal and the channel signal is modulated with both the pilot signals and the audio signal.

In the receiver unit 43, the demodulated pilot signals and audio signal appear at the output of the demodulator 31. The audio signal is passed through a pilot signal filter 49 to the speaker 33. The filter 49 is controlled in a manner which will be described below to reject the pilot signals during the automatic fine tuning operation and prevent the pilot signals from being fed to the speaker 33.

The pilot signals and audio signal are passed through a 250 Hz trap 51 and an amplifier 52 to a low-pass filter 53. It should be noted that the difference frequency of the pilot signals frequencies is 250 Hz. Subsequent to passing through the 250 Hz trap 51, the pilot signals are heterodyned to obtain a difference frequency signal, which is passed to the 250 Hz detector 54. The trap 51 prevents any noise signal of 250 Hz from passing therethrough and activating the 250 Hz detector 54.

Regardless of the frequency of the intermediate frequency signal, the difference frequency of the pilot signals will always be 250 Hz. For example, if the local oscillator signal was frequency deviated upward by 700 Hz, the pilot signal frequencies would be 1.7 kHz and 1.95 kHz respectively, but the difference frequency would still be 250 Hz. The low-pass filter 53 rejects frequencies above about 300 Hz and thereby rejects the pilot signals and most frequencies of the audio signal. In this manner, only the difference frequency signal of the pilot signals reaches the detector 54 and actuates the same.

Upon response of the 250 Hz difference frequency signal, the detector 54 produces an output signal which sets a control flip-flop 56. An output of the flip-flop 56 is applied to a filter control unit 57 which controls the pilot filter 49 to reject any signals at the pilot signal frequencies of 1 kHz and 1.25 kHz. This is to prevent the pilot signals from being passed to the speaker 33 to produce disturbing ringing noises if heard by the transceiver operator. Outputs of the flip-flop 56 are also applied to a switch 58 which controls the pilot units 44 and 46. Whereas the pilot units 44 and 46 are used as oscillators during transmission, they are used as frequency detectors during reception. Upon response of the signal from the flip-flop 56, the switch 58 controls the pilot units 44 and 46 to function as frequency detectors and also gates the pilot signals and audio signal thereto.

An output of the flip-flop 56 is also applied to a control voltage sweep generator 59 and a manual-auto switch 61. The leading edge of the signal from the flip-flop 56 constitutes a start signal causing the output voltage of the sweep generator 59 to rise from ground potential in a preferably linear manner. The switch 61 is controlled to gate the output of the sweep generator 59 rather than the voltage at the slider of the potentiometer R3 to the local oscillator 19.

The sweep generator 59 output which constitutes the control voltage sweeps upwardly thereby causing the local oscillator frequency to sweep upwardly. This further causes the intermediate frequency and the frequencies of the pilot signals to sweep upwardly. When the local oscillator frequency reaches a value such that the frequencies of the demodulated pilot signals are 1 kHz and 1.25 kHz respectively, the pilot units 44 and 46 produce respective control signals which are fed to a logical flip-flop 62 which is set in response to the control signals in simultaneity. The flip-flop 62 then feeds an output signal to the sweep generator 59 which causes the voltage sweep to be terminated and maintains the control voltage constant at the proper value to control the local oscillator 19 to produce the local oscillator signal at the proper frequency to maintain the demodulated pilot signals at 1 kHz and 1.25 kHz respectively. This ensures that the intermediate frequency will be correct and that optimum articulation of audio sounds will be achieved. In summary, the automatic fine tuning operation (control voltage sweep) is initiated in response to the difference frequency of the pilot signals and terminated when the demodulated pilot signals are determined to be at their proper frequencies.

Since rejection of the pilot signal frequencies will somewhat distort the audio signal, the pilot filter control 57 is connected to the flop-flop 62 in addition to the flip-flop 56. More specifically, when the automatic fine tuning operation is completed, it is desirable to allow all frequencies of the audio signal to reach the speaker 33. Thus, the control unit 57 is arranged to reject the pilot frequencies only during the automatic fine tuning operation or while the pilot signals are detected at their proper frequencies.

In order to ensure that the automatic fine tuning operation will be successfully accomplished, the pilot signals are transmitted for a length of time somewhat longer than that required for automatic fine tuning. During the automatic fine tuning operation the pilot signals are not at their required frequencies. The filter control unit 57 is arranged to reject the pilot signal frequencies from the time the flip-flop 56 is set to the time the flip-flop 62 is set, which is the time of the automatic fine tuning operation. However, after the local oscillator frequency is locked in, the pilot signals will still be received for a short period of time. Therefore, the filter control unit 57 is further arranged to reject the pilot signal frequencies as long as the control signals are produced by the pilot units 44 and 46. In summary, the filter control unit 57 causes the filter 49 to reject the pilot signal frequencies as long as the pilot signals are being received by the receiver unit 43 to prevent the pilot signals from being perceived as ringing noises. Thereafter, the filter 49 is controlled to allow all frequencies to reach the speaker 33 to prevent audio distortion. Since the automatic fine tuning operation is completed in less than 0.5 sec, the brief rejection of the pilot signal frequencies is generally not noticed.

It is possible that due to some malfunction in the transmitting transceiver the pilot signals will not be transmitted at all or will not be transmitted long enough for the automatic fine tuning operation to be completed. For this reason, an auto reset unit 63 is provided which is connected to the sweep generator 59 in such a manner as to serve as a voltage detector. More specifically, the reset unit 63 is actuated at the end of a voltage sweep of the sweep generator 59 when the control voltage is close to the power supply voltage, or when the control voltage exceeds a predetermined value. The reset unit 63 applies a reset signal in this case to the flip-flops 56 and 62 which reset the same. The low output of the flip-flop 56 causes the switch 61 to connect the potentiometer R3 rather than the sweep generator 59 to the local oscillator 19 so that the local oscillator voltage may be adjusted manually by means of the potentiometer R3. In summary, if the automatic fine tuning operation is not accomplished for some reason the receiver unit 43 is automatically switched over to manual fine tuning. It will be readily understood that this feature allows the present transceiver 41 to communicate with prior art transceivers which do not transmit pilot signals.

Figure 5A:
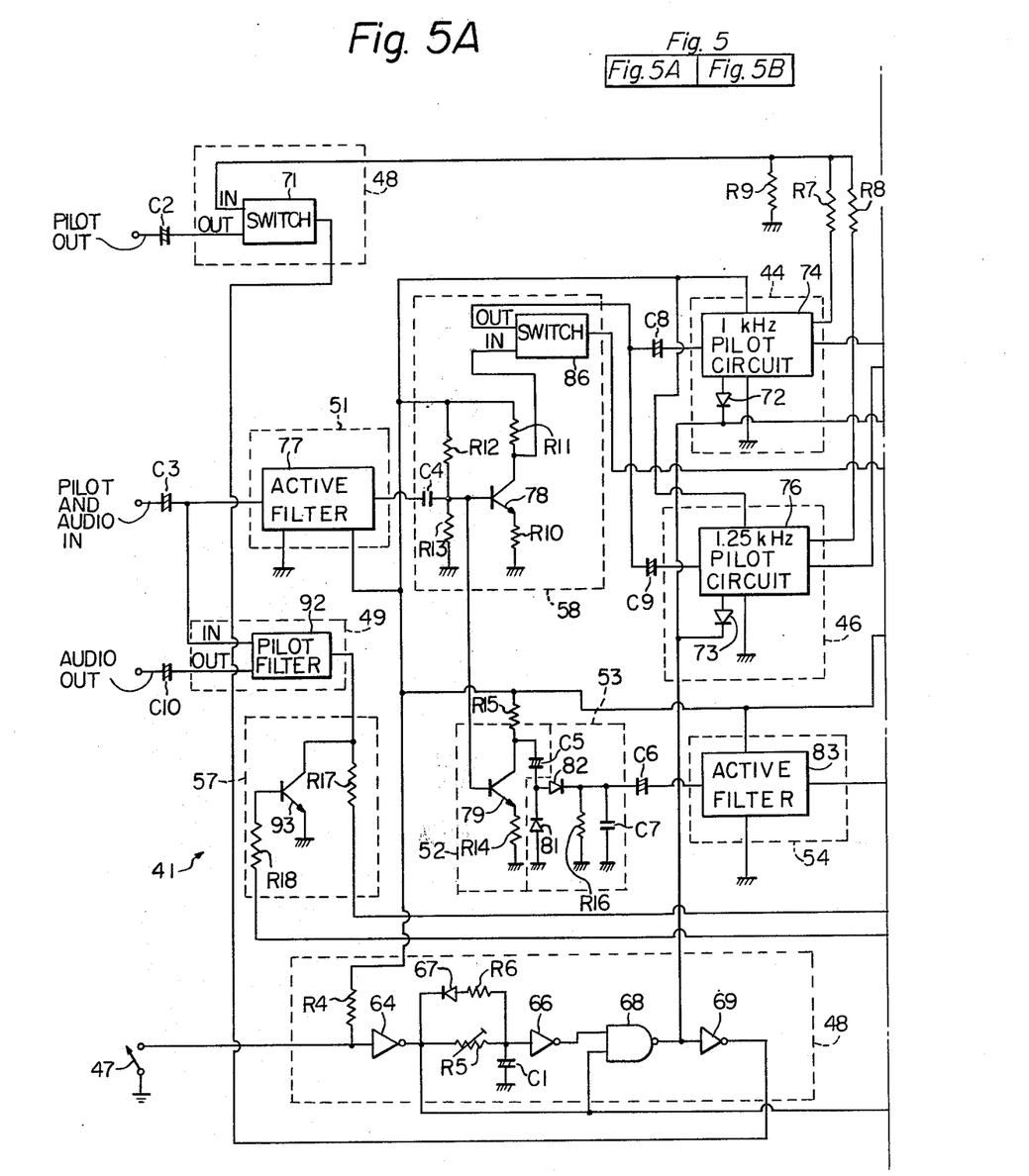
FIG. 5 is an electrical schematic diagram, partially in block form, of parts of the single sideband transceiver constituting novel features of the invention.
Figure 5B:
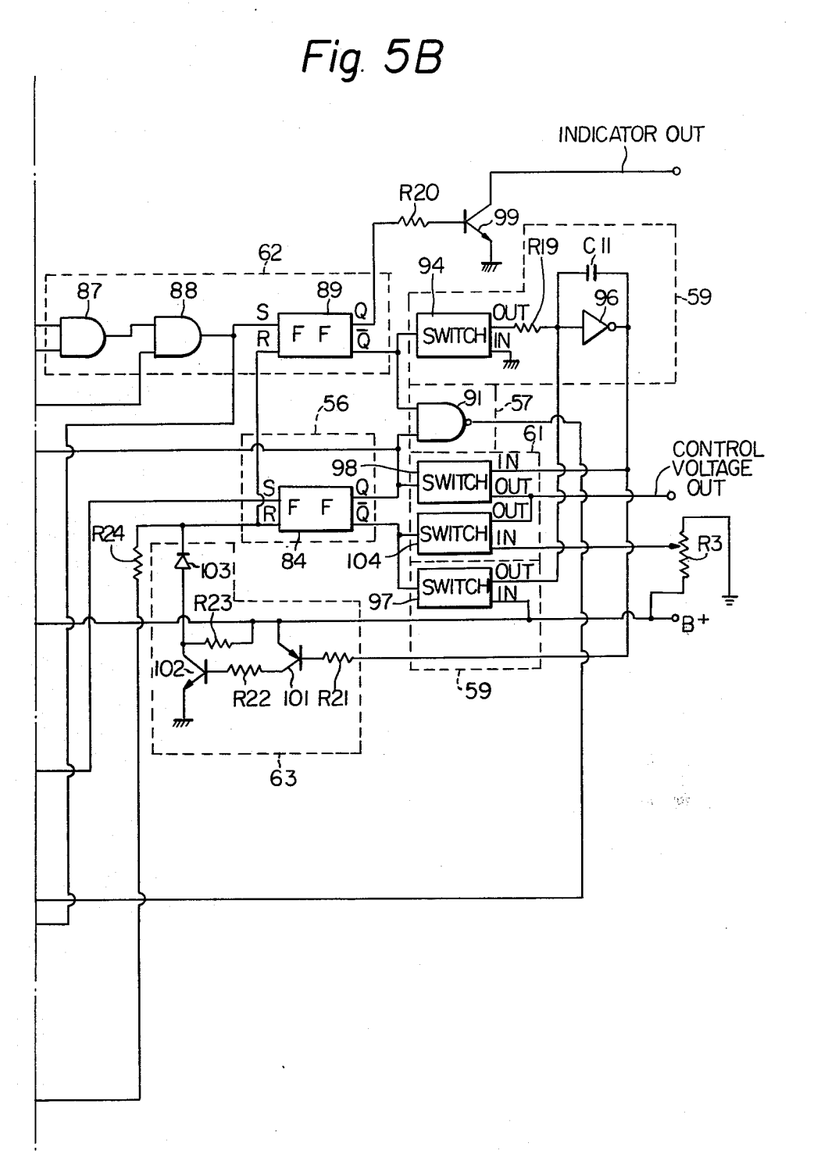

FIG. 5 shows the novel circuitry of the present invention in greater detail. The transmit-receive switch 47 is shown as being of the single-pole, single-throw type with the movable contact thereof grounded and the fixed contact thereof connected through a pull-up resistor R4 to a power source B+. The fixed contact of the switch 47 is further connected through an inverter 64 and a variable resistor R5 to the input of an inverter 66 of the timer-mixer 48. The input of inverter 66 is grounded through a capacitor C1. The cathode of a diode 67 is connected to the output of the inverter 64, the anode of the diode 67 being connected through a resistor R6 to the input of the inverter 66. The output of the inverter 66 is connected to an input of a NAND gate 68, the output of which is connected to an input of an inverter 69. The output of the inverter 64 is connected to another input of the NAND gate 68. The output of the inverter 69 is connected to a control input of an electronic switch 71 which constitutes part of the timer-mixer 48.

The output of the NAND gate 68 is connected to cathodes of diodes 72 and 73, anodes of the diodes 72 and 73 being connected to control inputs of 1 kHz and 1.25 kHz circuits 74 and 76 of the pilot units 44 and 46 respectively. Signal outputs of the circuits 74 and 76 are connected through resistors R7 and R8 to a signal input of the switch 71. The junction of the resistors R7 and R8 is grounded through a resistor R9. A signal output of the switch 71 is connected to the modulator 14 through a coupling capacitor C2.

For transmission, the switch 47 is closed thereby grounding the input of the inverter 64 which produces a high output. It is assumed that prior to closing the switch 47 the capacitor C1 is discharged thereby placing the input of the inverter 66 at ground potential. The inverter 66 produces a high output which is applied to the NAND gate 68. Since the outputs of both inverters 64 and 66 are high, the NAND gate 68 produces a low output and the inverter 69 produces a high output. The low output of the NAND gate 68 forward biases the diodes 72 and 73 and grounds the control inputs of the circuits 74 and 76. Although the internal circuitry of the circuits 74 and 76 is not the subject matter of the present invention and is not shown and described in detail, it will be assumed that a low control input causes the circuits 74 and 76 to oscillate and produce the pilot signals and a high control input inhibits oscillation and causes the circuits 74 and 76 to act as frequency detectors.

The low control inputs to the circuits 74 and 76 cause the same to oscillate and produce the control signals which are applied through the resistors R7 and R8 respectively across the resistor R9. The mixed pilot signals developed across the resistor R9 are applied to the input of the electronic switch 71.

The high output of the inverter 69 enables the switch 71 so that the pilot signals are gated through the switch 71 and coupling capacitor C2 to the modulator 14, in which they are mixed with the transmission carrier signal and audio signal as described hereinabove.

The high output of the inverter 64 reverse biases the diode 67 and causes the capacitor C1 to charge through the resistor R5, with the resistor R5 and capacitor C1 constituting an integrating circuit. When the voltage across the capacitor C1 exceeds the transistion voltage of the inverter 66, the output of the inverter 66 goes low. The time constant of the integrating circuit is adjustable by means of R5 so that the output of the inverter 66 remains high for about 0.5 sec. after the switch 47 is closed. The low output of the inverter 66 causes the output of the NAND gate 68 to go high and the output of the inverter 69 to go low. The high output of the NAND gate 68 reverse biases the diodes 72 and 73 and causes the circuits 74 and 76 to cease oscillating. The low output of the inverter 69 turns off the switch 71 and prevents the pilot signals from passing therethrough when the circuits 74 and 76 are used to detect demodulated pilot signals during reception.

In summary, it will be seen that due to the action of the timer-mixer 48 the pilot signals are transmitted for 0.5 seconds.

For reception, the switch 47 is opened and the pull-up resistor R4 applies a high input to the inverter 64 which produces a low output. The low output of the inverter 64 inhibits the NAND gate 68 so that the NAND gate 68 will produce a high output regardless of the output of the inverter 66. The high output of the NAND gate 68 causes the circuits 74 and 76 to function as frequency detectors. The low output of the inverter 64 forward biases the diode 67 and causes the capacitor C1 to discharge to ground potential through the resistor R6, which limits the current flow through the diode 67, in preparation for a subsequent transmission operation.

The pilot and audio signals from the demodulator 31 are applied to the 250 Hz trap 51 through a coupling capacitor C3, the trap 51 comprising a band exclusion active filter 77 designed to reject 250 Hz as described hereinabove. The output of the trap 51 is connected through a coupling capacitor C4 to the base of an NPN transistor 78 of the switch 58. The emitter of the transistor 78 is grounded through an emitter resistor R10 and the collector thereof is connected to B+ through an output resistor R11. A fixed bias is applied to the base of the transistor 78 by means of a voltage divider consisting of resistors R12 and R13 connected between B+ and ground. The base of the transistor 78 is connected to the base of an NPN transistor 79 of the amplifier 52. The emitter of the transistor 79 is grounded through an emitter resistor R14 and the collector of the transistor 79 is connected to B+ through an output resistor R15. The collector of the transistor 79 is connected through a coupling capacitor C5 to the cathode of a diode 81, the anode of which is grounded. The cathode of the diode 81 is further connected to the anode of a diode 82, the cathode of which is connected through a coupling capacitor C6 to the 250 Hz detector 54. A resistor R16 and a capacitor C7 are connected in parallel between the cathode of the diode 82 and ground. The resistor R16 and capacitor C7 serve as a low-pass filter which shunts high frequencies to ground. The non-linear frequency response of the diodes 81 and 82 is utilized to sharpen the cutoff action of the filter 53 as well as to heterodyne the pilot signals together to obtain the 250 kHz frequency difference signal. The filter 53 serves to sharply reject any frequencies over about 300 Hz.

The detector 54 comprises an active filter 83 which is designed to produce a high control output in response to a frequency of 250 Hz. Therefore, the detector 54 produces a high output in response to the difference frequency of the pilot signals and applies the same to a set input of a flip-flop circuit 84 which constitutes the functioning element of the flip-flop 56. This signal sets the circuit 84 so that the high Q output thereof turns on an electronic switch circuit 86 of the switch 58. The pilot signals and audio signal are applied from the collector of the transistor 78 to an input of the switch circuit 86 and are gated through the circuit 86 and coupling capacitors C8 and C9 to signal inputs of the circuits 74 and 76 respectively.

Control signal outputs of the circuits 74 and 76 are connected to inputs of an AND gate 87, the output of which is connected to an input of an AND gate 88. The output of the NAND gate 68 is connected to another input of the AND gate 88, the output of which is connected to a set input of a flip-flop circuit 89 of the logical flip-flop 62. The high output of the NAND gate 68 enables the AND gate 88. However, until the pilot signals are detected at their proper frequencies the AND gate 87 and thereby the AND gate 88 will produce low outputs. It will again be assumed that the flip-flop circuit 89 was reset previously and that the $\bar{Q}$ output thereof is high. The $\bar{Q}$ output of the flip-flop circuit 89 and the Q output of the flip-flop circuit 84 are connected to inputs of a NAND gate 91 of the control unit 57, the output of which is connected through a resistor R17 to a control input of a filter circuit 92 of the pilot filter 49. Under these conditions the NAND gate 91 produces a low output which grounds the control input of the filter circuit 92, causing the circuit 92 to reject the pilot frequencies. The combined audio and pilot signals are applied to an input of the filter circuit 92 through the capacitor C3. However, only the audio signal (with any 1 kHz and 1.25 kHz components thereof rejected) is passed from an output of the filter circuit 92 through a coupling capacitor C10 to the audio amplifier 32.

The low output of the AND gate 88 is applied through a resistor R18 to the base of an NPN transistor 93, the emitter of which is grounded, thereby turning off the transistor 93. Although the collector of the transistor 93 is connected to the control input of the filter circuit 49, the transistor 93 has no effect under these conditions since it is turned off. The high $\overline{Q}$ output of the circuit 89 turns on an electronic switch 94 of the sweep generator 59, which connects the input of an inverter 96 to ground through a resistor R19. A capacitor C11 is connected between the input and output of the inverter 96, and the input of the inverter 96 is further connected to an output of an electronic switch 97. An input of the switch 97 is connected to B+ and a control input of the switch 97 is connected to the $\overline{Q}$ output of the circuit 84. Prior to detection of the 250 Hz difference frequency, the $\overline{Q}$ output of the circuit 84 is high turning on the switch 97 and connecting the input of the inverter 96 to B+ through the switch 97. The high $\overline{Q}$ output of the circuit 89 turns on the switch 94 thereby connecting the end of the resistor R19 which is connected to the output of the switch 94 to ground. The output of the inverter 96 is low and the capacitor C11 charges up to B+ potential.

The output of the inverter 96 constitutes the control voltage for the local oscillator in the automatic fine tuning mode and is applied to the input of an electronic switch 98, the output of the switch 98 being connected to the local oscillator 19. Upon detection of the 250 Hz difference signal, the Q output of the flip-flop circuit 84 goes high and is applied to a control input of the switch 98 turning the same on and connecting the output of the inverter 96 to the local oscillator 19 therethrough.

Upon detection of the 250 Hz difference signal the $\overline{Q}$ output of the circuit 84 goes low, turning off the switch 97 and disconnecting the input of the inverter 96 from B+. The capacitor C11 discharges through the resistor R19 and switch 94 and the output voltage of the inverter 96 rises in the form of a sawtooth wave. This rising or sweeping voltage is applied to the local oscillator 19 through the switch 98 causing the local oscillator frequency, intermediate frequency and pilot signal frequencies to rise. When the pilot signal frequencies reach their predetermined values, the pilot circuits 74 and 76 produce high control signal outputs which are applied to the AND gate 87. With the outputs of the NAND gate 68 and AND gate 87 high, the AND gate 88 produces a high output which sets the flip-flop circuit 89. The low $\overline{Q}$ output of the circuit 89 turns off the switch 94 and disconnects the resistor R19 from ground. This causes the capacitor C11 to stop discharging and interrupts the control voltage sweep. In other words, upon detection of the pilot signals at the proper frequencies discharge of the capacitor C11 ceases and the output voltage of the inverter 96, which constitutes the control voltage for the local oscillator 19, is maintained constant at the voltage existing at the time the pilot signals are detected. This maintains the local oscillator 19 at exactly the proper frequency. In practice, the local oscillator frequency once set in this manner will hold within ±50 Hz for as long as one hour, which is much longer than any reasonable reception time.

The Q output of the flip-flop circuit 89 is connected through a resistor R20 to the base of an NPN transistor 99, the emitter of which is grounded. The collector of the transistor 99 is connected through an indicator light (not shown) to B+. When the Q output of the circuit 89 goes high, indicating that the automatic fine tuning operation is completed, the transistor 99 is turned on thereby energizing the indicator light.

The low $\overline{Q}$ output of the circuit 89 causes the NAND gate 91 to produce a high output which is applied to the resistor R17. However, the output of the AND gate 88 is high turning on the transistor 93 and grounding the control input of the filter circuit 92 therethrough. The high output of the NAND gate 91 is dropped across the resistor R17 and the filter circuit 92 continues to reject the pilot signal frequencies. However, when transmission of the pilot signals ends, the control outputs of the circuits 74 and 76 and the outputs of the AND gates 87 and 88 go low. The low output of the AND gate 88 turns off the transistor 93 thereby allowing the high output of the NAND gate 91 to be applied to the filter circuit 92. The filter circuit 92 thereafter allows all frequencies to pass therethrough as described hereinabove.

If the transmitting transceiver is not equipped to transmit pilot signals or does not transmit pilot signals long enough to complete automatic fine tuning, the transceiver 41 is automatically set to the manual fine tuning mode by the auto reset unit 63 which comprises an PNP transistor 101 having an emitter connected to B+. The output of the inverter 96 is connected to the base of the transistor 101 through a resistor R21. The collector of the transistor 101 is connected to the base of an NPN transistor 102 through a resistor R22. The emitter of the transistor 102 is grounded and the collector thereof is connected to B+ through a resistor R23. The collector of the transistor 102 is further connected to the anode of a blocking diode 103, the cathode of which is connected to reset inputs of the flip-flop circuits 84 and 89.

The transistors 101 and 102 are biased in such a manner as to constitute a voltage detector. In the event that the output voltage of the inverter 96 rises close to B+ due to a failure to detect the pilot signals at their proper frequencies, the auto reset unit 63 is arranged to feed a high output to the reset inputs of the flip-flop circuits 84 and 89 thereby resetting the same and switching the transceiver 41 to manual fine tuning. More specifically, the transistors 101 and 102 are turned on by an output voltage of the inverter 96 below a predetermined value. The low output voltage of the transistor 102 reverse biases the diode 103. When the output voltage of the inverter 96 exceeds the predetermined value, the transistor 101 is turned off thereby turning off the transistor 102. The diode 103 is forward biased through the resistor R23 and B+ is applied to the reset inputs of the flip-flop circuits 84 and 89 resetting the same.

The low Q output of the circuit 84 turns off the switch 98 and disconnects the inverter 96 from the local oscillator 19. However, the high $\overline{Q}$ output of the circuit 84 turns on a switch 104 which connects the slider of the potentiometer R3 to the local oscillator 19. In this maner, the local oscillator frequency may be manually adjusted for fine tuning by means of the potentiometer R3.

The output of the inverter 64 is connected to the reset inputs of the circuits 84 and 89 to reset the same when the switch 47 is closed for transmission. More specifically, with the switch 47 closed the inverter 64 produces a high output which is applied through a resistor R24 to the circuits 84 and 89 to reset the same.

The various filters, electronic switches, gates and the like may be embodied at low cost and with high reliability using cmos technology. The active filters are preferably cmos hybrid units.

In summary, it will be seen that the present invention provides a single sideband transceiver which accomplishes precise automatic fine tuning utilizing inexpensive circuitry. The transceiver is compatible with prior art transceivers which do not transmit pilot signals since it incorporates means to automatically switch to manual fine tuning. The use of two pilot signals and the difference frequency therebetween for automatic fine tuning control functions makes the transceiver extremely immune to noise. Many modifications to the present transceiver will becomd possible for those skilled in the art after receiving the teachings of this disclosure. For example, although the present transceiver is shown and described as operating in the single sideband mode, it may be advantageously adapted to other modes of modulation.

What is claimed is:

1. A transceiver comprising:
a transmitter unit; and
a receiver unit for receiving a channel signal modulated with first and second pilot signals of first and second predetermined frequencies, respectively, the receiver unit including:
a voltage controlled local oscillator for generating a local oscillator signal;
a mixer means for mixing the local oscillator signal with the modulated channel signal;
a demodulator means for receiving the signal from said mixer means for demodulating it to obtain said pilot signals;
a voltage sweep generator and means for applying a control voltage from said generator to said local oscillator;
means including a first frequency detector responsive to the difference frequency of the demodulated pilot signals for applying a start signal to the sweep generator to initiate a control voltage sweep which causes a local oscillator signal frequency sweep;
means including a second frequency detector responsive to the demodulated pilot signals for producing a first control signal in response to the first predetermined frequency;
means including a third frequency detector responsive to the demodulated pilot signals for producing a second control signal in response to the second predetermined frequency; and
a sweep control means connected to the sweep generator for interrupting the voltage sweep and maintaining the control voltage constant in response to the first and second control signals in simultaneity.

2. A transceiver as in claim 1, in which the receiver unit further comprises:
a transmit-receive switch;
a manually controlled variable voltage source;
a switch unit connected to the sweep generator, voltage source and local oscillator; and
a reset means connected to the sweep generator and switch unit, the switch unit connecting only the sweep generator to the local oscillator in response to the transmit-receive switch being moved to a receive position thereof, the reset unit being responsive to the control voltage and controlling the switch unit to connect only the voltage source to the local oscillator in response to the control voltage exceeding a predetermined value.

3. A transceiver as in claim 1, in which the channel signal is further modulated with an audio signal, the receiver unit further comprising:
an audio amplifier; and
a pilot signal filter connected between the demodulator means and the audio amplifier, the filter being controlled by the sweep control unit to reject the first and second predetermined frequencies during the voltage sweep.

4. A transceiver as in claim 3, in which the filter is further constructed to reject the first and second predetermined frequencies in response to the first and second control signals.

5. A transceiver as in claim 1, in which the receiver unit further comprises a filter connected between the demodulator means and the first frequency detector for rejecting a difference frequency of the first and second predetermined frequencies.

6. A transceiver as in claim 1, in which the transmitter unit comprises:
a transmit-receive switch connected to the second and third frequency detectors for controlling the same to oscillate and produce the first and second pilot signals respectively when the transmit-receive switch is in a transmit position;
a transmission carrier signal oscillator for generating a transmission carrier signal;
a balanced modulator means for mixing the pilot signals, carrier signals and an audio signal and modulating the carrier signal therewith, generating two sideband signals, suppressing the carrier signal and suppressing one of the sideband signals;
a channel signal oscillator for generating the channel signal; and
a mixer for modulating the channel signal with the unsupressed sideband signal;
the receiver unit comprising;
a reception carrier signal oscillator for generating a reception carrier signal, the demodulator means including a mixer for mixing the modulated channel signal with the local oscillator signal to recover the unsuppressed sideband signal and a balanced demodulator for mixing the reception carrier signal with the recovered sideband signal to demodulate the pilot signals and audio signal.

* * * * *